(12) United States Patent
Ling et al.

(10) Patent No.: US 12,620,872 B2
(45) Date of Patent: May 5, 2026

(54) INTEGRATED ELECTRIC DRIVE SYSTEM AND ELECTRIC VEHICLE

(71) Applicant: BYD COMPANY LIMITED, Guangdong (CN)

(72) Inventors: Heping Ling, Shenzhen (CN); Zhen Zhai, Shenzhen (CN); Lei Hu, Shenzhen (CN); Yuchao Xiong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 423 days.

(21) Appl. No.: 18/128,666

(22) Filed: Mar. 30, 2023

(65) Prior Publication Data

US 2023/0241954 A1     Aug. 3, 2023

Related U.S. Application Data

(63) Continuation of application No. PCT/CN2021/121798, filed on Sep. 29, 2021.

(30) Foreign Application Priority Data

Sep. 30, 2020     (CN) .......................... 202011063762.8

(51) Int. Cl.
  *H02K 9/19*         (2006.01)
  *H02K 5/20*         (2006.01)
  (Continued)

(52) U.S. Cl.
  CPC .............. *H02K 9/19* (2013.01); *H02K 5/203* (2021.01); *H02K 7/116* (2013.01); *H02K 11/0094* (2013.01); *H02K 11/33* (2016.01)

(58) Field of Classification Search
  CPC ...... H02K 9/19; H02K 11/33; H02K 11/0094; H02K 7/116; H02K 3/50; H02K 7/006;
  (Continued)

(56) References Cited

U.S. PATENT DOCUMENTS

2004/0226761 A1* 11/2004 Takenaka .............. B60K 6/405
                                                            903/906

FOREIGN PATENT DOCUMENTS

CN        207603714 U      7/2018
CN        207725217 U  *  8/2018
                    (Continued)

OTHER PUBLICATIONS

Chen et al, A New Energy Car Integrated Drive System, Aug. 14, 2018, CN 207725217 (English Machine Translation) (Year: 2018).*
(Continued)

*Primary Examiner* — Alexander A Singh
(74) *Attorney, Agent, or Firm* — Sheppard Mullin Richter & Hampton LLP

(57) ABSTRACT

A drive system includes a motor, a speed reducer, a controller, and a housing. The housing includes: a first accommodation space for accommodating the controller; a second accommodation space configured for accommodating the motor; and a third accommodation space configured for accommodating the speed reducer. The controller is connected with the motor, and an output shaft of the motor is connected with the speed reducer. In a length direction of the output shaft, an absolute value of a difference between a mounting width and a width of the first accommodation space is no greater than a first difference threshold. In a direction perpendicular to the length direction of the output shaft and parallel to a horizontal plane, an absolute value of a difference between a length of the first accommodation space and a length of the third accommodation space is no greater than a second difference threshold.

20 Claims, 4 Drawing Sheets

(51) Int. Cl.

| | | |
|---|---|---|
| *H02K 7/116* | (2006.01) | |
| *H02K 11/00* | (2016.01) | |
| *H02K 11/33* | (2016.01) | |

(58) Field of Classification Search
CPC ............... H02K 5/203; H02K 2213/03; H02K 2203/09; H02K 2211/03; B60L 15/20; B60L 50/60; B60K 17/04; B60K 1/00; B60K 2001/006; B60K 2001/003; H02J 7/0042; B60Y 2200/91; F16H 1/20; Y02T 10/70; B60H 1/3229
USPC .......................................... 310/89, 52, 54, 58
See application file for complete search history.

(56) References Cited

FOREIGN PATENT DOCUMENTS

| | | | |
|---|---|---|---|
| CN | 109353201 A | 2/2019 | |
| CN | 109955702 A | 7/2019 | |
| CN | 110360922 A | 10/2019 | |
| CN | 210911983 U | 7/2020 | |
| EP | 2093098 A1 | 8/2009 | |
| JP | H06280946 A | 10/1994 | |
| JP | 2015-054612 A | 3/2015 | |
| JP | 6014599 B2 | 10/2016 | |
| JP | 2019-138381 A | 8/2019 | |
| WO | 2008032837 A1 | 3/2008 | |
| WO | 2013069774 A1 | 5/2013 | |
| WO | 2018/061443 A1 | 4/2018 | |
| WO | 2019/154155 A1 | 8/2019 | |
| WO | 2019202947 A1 | 10/2019 | |
| WO | 2019208642 A1 | 10/2019 | |

OTHER PUBLICATIONS

International Search Report and Written Opinion for Application No. PCT/CN2021/121798, mailed on Jan. 7, 2022, 8 pages.

Examination Report No. 1 dated Apr. 4, 2024, issued in related Australian Patent Application No. 2021353687 (4 pages).

Extended European Search Report dated Mar. 15, 2024, issued in related European Patent Application No. 21874547.9 (15 pages).

Extended European Search Report dated Apr. 30, 2025, issued in related European Patent Application No. 25153968.0 (14 pages).

First Office Action and Search Report dated Jan. 20, 2023, issued in related Chinese Patent Application No. 202011063762.8, with English machine translation (9 pages).

Notice of Reasons for Refusal dated Jun. 4, 2024, issued in related Japanese Patent Application No. 2023-519846, with English machine translation (15 pages).

Decision of Refusal dated Dec. 3, 2024, issued in related Japanese Patent Application No. 2023-519846, with English machine translation (12 pages).

Notice of Reasons for Refusal dated Feb. 28, 2025, issued in related Japanese Patent Application No. 2025-009892, with English machine translation (19 pages).

Decision of Refusal dated May 13, 2025, issued in related Japanese Patent Application No. 2025-009892, with English machine translation (16 pages).

Request for the Submission of an Opinion dated Oct. 22, 2024, issued in related Korean Patent Application No. 10-2023-7013037, with English machine translation (13 pages).

Notice of Final Rejection dated Jun. 10, 2025, issued in related Korean Patent Application No. 10-2023-7013037, with English machine translation (11 pages).

* cited by examiner

INTEGRATED ELECTRIC DRIVE SYSTEM AND ELECTRIC VEHICLE

CROSS-REFERENCE TO RELATED APPLICATIONS

This application is a Continuation Application of International Patent Application No. PCT/CN2021/121798, filed on Sep. 29, 2021 and entitled "INTEGRATED ELECTRIC DRIVING SYSTEM AND ELECTRIC VEHICLE", which is based on and claims priority to and benefits of Chinese Patent Application No. 202011063762.8, filed on Sep. 30, 2020. The entire content of all of the above-referenced applications is incorporated herein by reference.

FIELD

The present disclosure relates to the technical field of electric vehicles, and more specifically, to an integrated electric drive system and an electric vehicle.

BACKGROUND

An electric drive system is a core component of an electric vehicle. With the continuous development of new energy vehicles, there are increasingly high requirements for the arrangement of the vehicle driving system. The electric drive system is composed of components such as a driving motor, a motor controller, a transmission, an air compressor, a water pump, a vehicle controller, an on-board charger, and a DC converter. In the related art, an integrated control enclosure of the electric drive system is generally mounted on a top of a stator housing of the driving motor, the transmission is mounted to an output shaft end of the driving motor, and the air compressor is hung on the transmission through a support. However, such an integrated electric drive system has disadvantages such as a large overall weight, a low integration level, a large accommodation space, and high costs of molds and materials, and the like.

SUMMARY

The present disclosure provides an integrated electric drive system and an electric vehicle, to solve the technical problems such as a low integration level and a large accommodation space of the electric drive system in the related art.

In a first aspect of the present disclosure, a drive system provided in an embodiment of the present disclosure includes a motor, a speed reducer, a controller, and a housing. The housing includes a first accommodation space having a first opening and configured for accommodating the controller. A second accommodation space is configured for accommodating the motor, and a third accommodation space is configured for accommodating the speed reducer. The second accommodation space and the third accommodation space of the housing are disposed below the first accommodation space. The controller is connected with the motor. An output shaft of the motor is connected with the speed reducer.

In a length direction of the output shaft of the motor, an absolute value of a difference between a mounting width value and a width value of the first accommodation space is less than or equal to a first difference threshold; and the mounting width value is a sum of a width value of the second accommodation space and a width value of the third accommodation space.

In a direction perpendicular to the length direction of the output shaft and parallel to a horizontal plane, an absolute value of a difference between a length value of the first accommodation space and a length value of the third accommodation space is less than or equal to a second difference threshold.

In an embodiment of the present disclosure, in the direction perpendicular to the length direction of the output shaft and parallel to the horizontal plane, an absolute value of a difference between a half of the length value of the first accommodation space and the length value of the second accommodation space is less than or equal to a third difference threshold.

In an embodiment of the present disclosure, the first difference threshold is zero.

In an embodiment of the present disclosure, the second difference threshold is zero.

In an embodiment of the present disclosure, the third difference threshold is zero.

In an embodiment of the present disclosure, the drive system further includes an air conditioning compressor and a support mounted on a surface of the speed reducer away from the second accommodation space. The air conditioning compressor is mounted to the support and connected with the controller.

In an embodiment of the present disclosure, the drive system further includes a water pump mounted on the support and connected with the controller.

In an embodiment of the present disclosure, the support includes a vertical plate and a transverse plate connected with an upper end of the vertical plate. The vertical plate is mounted to a surface of the speed reducer away from the motor, the water pump is mounted above the transverse plate, and the air conditioning compressor is mounted to a side of the vertical plate away from the speed reducer and is located below the transverse plate.

In an embodiment of the present disclosure, the controller includes a capacitor, an insulated-gate bipolar transistor (IGBT), a three-phase copper bar, a DC bus, an on-board charger, and a DC converter. The on-board charger and the DC converter are connected with a vehicle power battery. The capacitor, the IGBT, the three-phase copper bar, the on-board charger, and the DC converter are mounted in the first accommodation space. The capacitor is connected with the vehicle power battery through the DC bus mounted to the housing. The three-phase copper bar is connected with a three-phase terminal of the motor.

The vehicle power battery drives the motor to rotate through the DC bus, the capacitor, the IGBT, and the three-phase copper bar connected in sequence.

In an embodiment of the present disclosure, the on-board charger and the DC converter include a heat dissipator, an electric control element driver, and a heating element driver. The heating element driver is mounted to the heat dissipator, and the electric control element driver is mounted to an end of the heating element driver away from the heat dissipator.

In an embodiment of the present disclosure, the first accommodation space includes a first internal space and a second internal space both having a rectangular shape and adjacent to each other.

The capacitor, the IGBT, and the three-phase copper bar are mounted in the first internal space. The on-board charger and the DC converter are mounted in the second internal space, and the DC bus is located on a side of the first internal space facing away from the second internal space.

In an embodiment of the present disclosure, the housing includes a first cooling water channel, a second cooling water channel, a water channel inlet, and a water channel outlet. The first cooling water channel is arranged at a position in the housing opposite to the IGBT, and the second cooling water channel is arranged at a position in the housing opposite to the on-board charger and the DC converter.

A first end of the water channel inlet is connected with a water inlet device, a second end of the water channel inlet is connected with the first cooling water channel and the second cooling water channel, and the water channel outlet is connected with an end of the first cooling water channel and an end of the second cooling water channel away from the water channel inlet.

In an embodiment of the present disclosure, the motor includes an outer box connected with the speed reducer and an inner box inserted in the outer box. A cooling space is formed between an inner wall of the outer box and an outer wall of the inner box. A water inlet and a water outlet in communication with the cooling space are disposed on the outer box. An end of the water channel outlet away from the first cooling water channel is in communication with the water inlet.

In an embodiment of the present disclosure, multiple ribbed flow guide plates are disposed on the outer wall of the inner box in a circumferential direction of the output shaft of the motor.

In an embodiment of the present disclosure, the speed reducer includes a main shaft, an intermediate shaft, an output shaft, a driving gear, an output gear, an intermediate driving gear, and an intermediate driven gear. The main shaft is connected with the output shaft of the motor. The driving gear is mounted to the main shaft, the intermediate driving gear and the intermediate driven gear are mounted to the intermediate shaft, and the output gear is mounted to the output shaft. The intermediate driving gear is meshed with the driving gear, and the intermediate driven gear is meshed with the output gear.

On a plane perpendicular to the axis of the main shaft, an axis of the intermediate shaft is higher than an axe of the main shaft and an axe of the output shaft; and an included angle between the horizontal plane and a line connecting a center point of the main shaft to a center point of the output shaft is less than or equal to a preset angle.

In an embodiment of the present disclosure, a battery mounting space configured for mounting a battery is disposed on a surface of the housing facing away from the first opening.

In an embodiment of the present disclosure, the drive system further includes a housing cover adaptively connected with the first opening.

In the embodiments of the present disclosure, the integrated electric drive system integrates the controller, the motor, and the speed reducer. The controller is mounted in the first accommodation space within the housing, and the motor and the speed reducer are respectively mounted in the second accommodation space and the third accommodation space in the lower portion of the housing. In addition, an absolute value of a difference between a sum of the width value of the second accommodation space and the width value of the third accommodation space and the width value of the first accommodation space is less than or equal to the first difference threshold. The absolute value of the difference between the length value of the first accommodation space and the length value of the third accommodation space is less than or equal to the second difference threshold in the direction perpendicular to the output shaft of the motor and parallel to a horizontal plane. Through the above arrangement, the mounting spaces of the integrated electric drive system in all directions are more balanced, and no large hanging space is left in all directions, which improves the modality of the housing and noise, vibration, and harshness (NVH) of the vehicle. In addition, the integrated electric drive system has a high integration level, which reduces the mounting space of the integrated electric drive system on the vehicle, thereby providing a space for a larger motor. Moreover, a complex wiring harness connection between the components is omitted in the integrated electric drive system with the high integration level.

A second aspect of the present disclosure further provides an electric vehicle, including the above integrated electric drive system.

Some of the additional aspects and advantages of the present disclosure are to be given in the following description, and become apparent in the following description or understood through the practice of the present disclosure.

DETAILED DESCRIPTION

Figure 1:
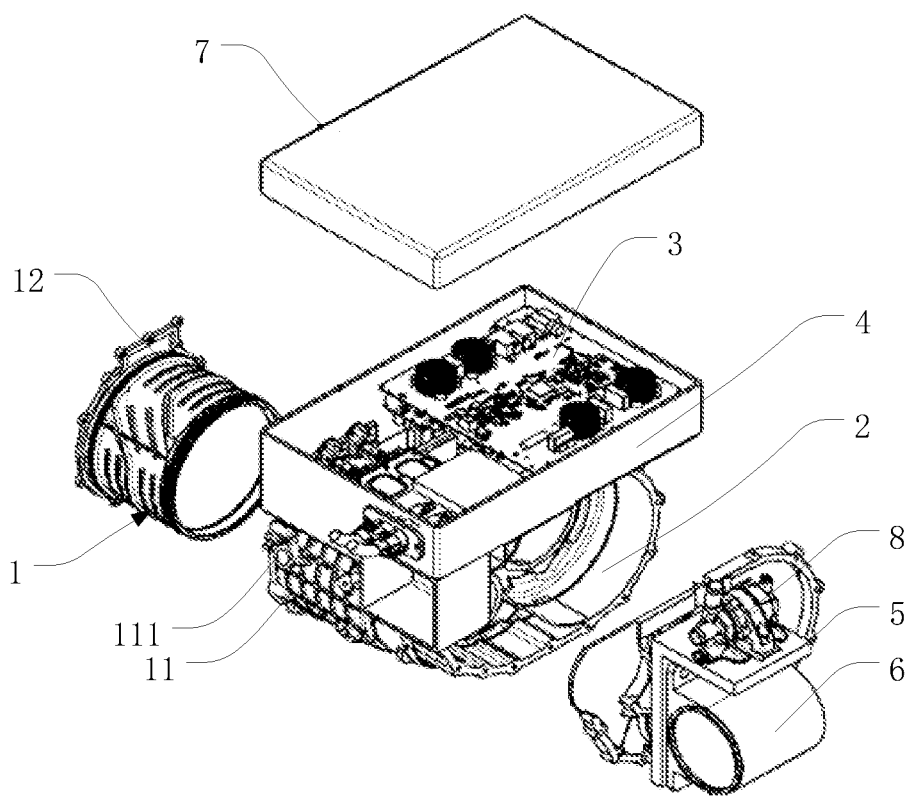
FIG. 1 is a schematic diagram of an exploded structure of an integrated electric drive system according to an embodiment of the present disclosure.

In order to make the technical problems, technical solutions, and beneficial effects to be solved in the present disclosure clearer, the present disclosure is further described in detail below with reference to the accompanying drawings and embodiments. It should be understood that the embodiments described herein are merely used to explain the present disclosure but not to limit the present disclosure.

It should be understood that orientation or position relationships indicated by the terms such as "up", "down", "left", "right", "front", "back", and "middle" are based on orientation or position relationships shown in the accompanying drawings, and are used only for ease of description of the present disclosure and brevity of the description, rather than indicating or implying that the mentioned apparatus or element need to have a particular orientation or be constructed and operated in a particular orientation. Therefore, such terms should not be construed as a limitation on the present disclosure.

In the present disclosure, in order to better show a structure of the integrated electric drive system and the connection relationship thereof, the term "up" in the present disclosure means an actual direction pointing to the top of the vehicle (that is, above the integrated electric drive system shown in FIG. 2), the term "down" in the present disclosure means an actual direction pointing to the bottom of the vehicle (that is, below the integrated electric drive system shown in FIG. 2), the "left" in the present disclosure means the left of the integrated electric drive system shown in FIG. 2, and the "right" in the present disclosure means the right of the integrated electric drive system shown in FIG. 2.

As shown in FIG. 1 to FIG. 4, an integrated electric drive system provided in an embodiment of the present disclosure includes a motor 1, a speed reducer 2, a controller 3, and a housing 4. The housing 4 may be a single-piece housing. A first accommodation space 41 having a first opening and configured for the controller 3 to be mounted is recessed on the housing 4. A second accommodation space 42 configured for the motor 1 to be mounted and a third accommodation space 43 configured for the speed reducer 2 to be mounted are disposed in a direction of the housing 4 facing away from the first opening. The controller 3 is connected with the motor 1. An output shaft 23 of the motor 1 is connected with the speed reducer 2. It may be understood that the first accommodation space 41 is located in the housing 4, and the second accommodation space 42 and the third accommodation space 43 are respectively located on lower left and right of the housing 4. The controller 3 includes a motor controller, a vehicle power battery controller, a vehicle power battery charging/discharging device, and the like.

Figure 3:
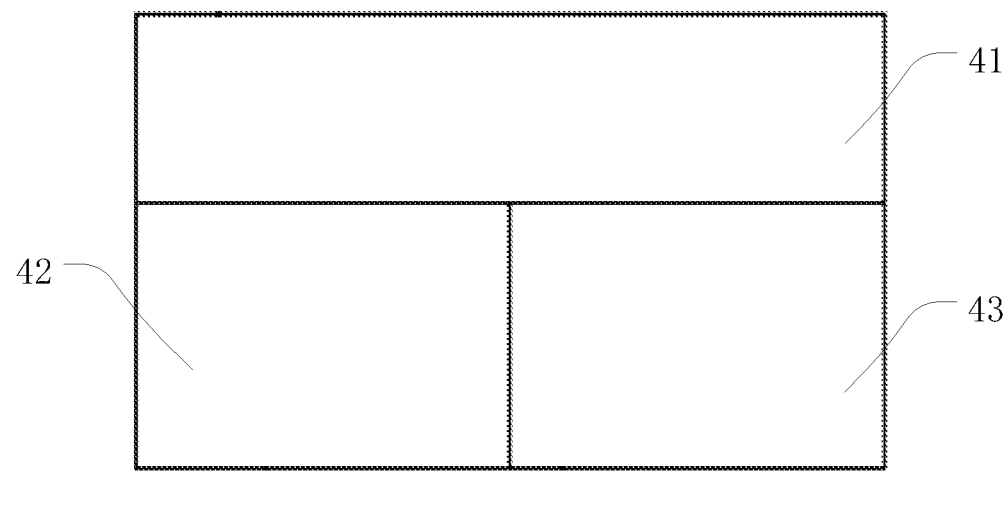
FIG. 3 is a schematic diagram showing arrangement of a first accommodation space, a second accommodation space, and a third accommodation space of an integrated electric drive system according to an embodiment of the present disclosure.
Figure 4:
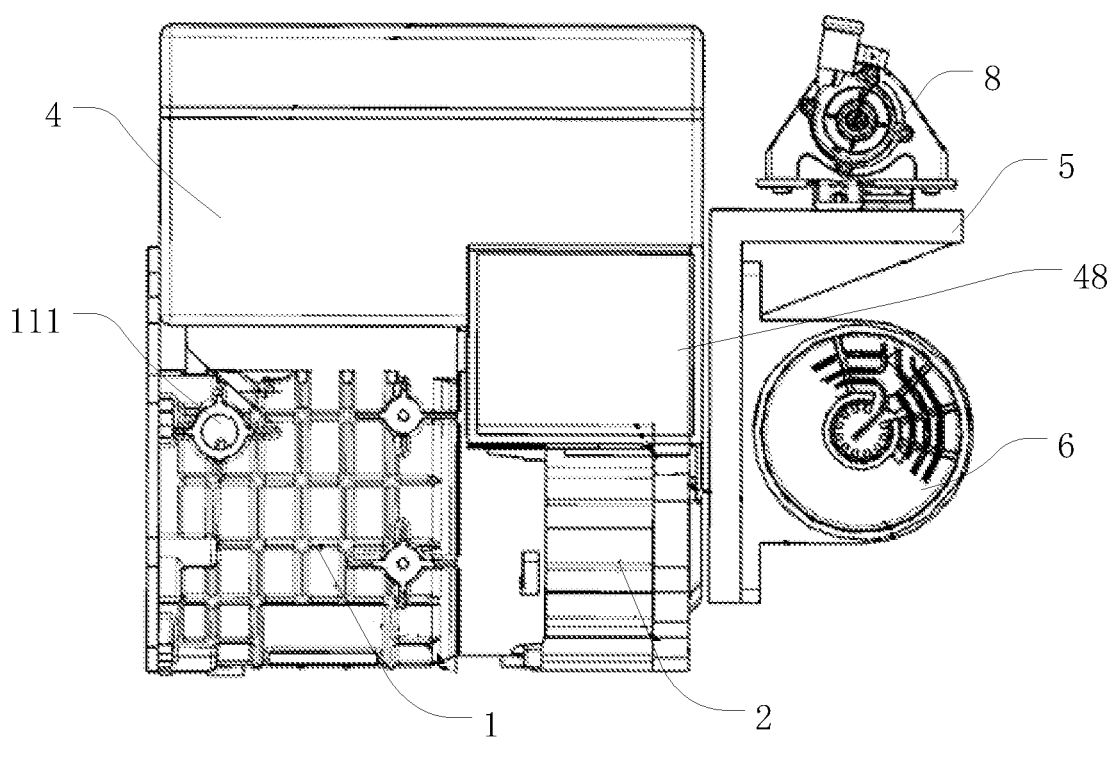
FIG. 4 is a schematic structural diagram of an integrated electric drive system according to an embodiment of the present disclosure.

As shown in FIG. 3 and FIG. 4, an absolute value of a difference between a preset mounting width value and a width value of the first accommodation space 41 is less than or equal to a first difference threshold in a direction parallel to the output shaft 23 of the motor 1. The preset mounting width value is a sum of a width value of the second accommodation space 42 and a width value of the third accommodation space 43. In some embodiments of present disclosure, the first difference threshold is zero. That is, the width value of the first accommodation space 41 is equal to a sum of the width value of the second accommodation space 42 and the width value of the third accommodation space 43. In other words, the motor 1 and the speed reducer 2 fill a lower part of the housing 4 in the width direction of the housing 4 (that is, in the direction parallel to the output shaft 23 of the motor 1). It may be understood that the first difference threshold may further be set according to an actual demand, for example, a value range of the first difference threshold is 0-10 mm (for example, 3 mm, 6 mm, 9 mm, and the like).

An absolute value of a difference between a length value of the first accommodation space 41 and a length value of the third accommodation space 43 is less than or equal to a second difference threshold in the direction perpendicular to the output shaft 23 of the motor 1 and parallel to a horizontal plane. In some embodiments of the present disclosure, the second difference threshold is zero. That is, the length value of the first accommodation space 41 is equal to a length value of the third accommodation space 43. In other words, the speed reducer 2 fills a lower side of the housing 4 in a length direction of the housing 4. It may be understood that the second difference threshold may further be set according to an actual demand, for example, a value range of the second difference threshold is 0-10 mm (for example, 3 mm, 6 mm, 9 mm, and the like).

In the present disclosure, the integrated electric drive system integrates the controller 3, the motor 1, and the speed reducer 2. The controller 3 is mounted in the first accommodation space 41 within the housing 4, and the motor 1 and the speed reducer 2 are respectively mounted in the second accommodation space 42 and the third accommodation space 43 in the lower portion of the housing 4. In addition, an absolute value of a difference between a sum of the width value of the second accommodation space 42 and the width value of the third accommodation space 43 and the width value of the first accommodation space 41 is less than or equal to the first difference threshold. The absolute value of the difference between the length value of the first accommodation space 41 and the length value of the third accommodation space 43 is less than or equal to the second difference threshold in the direction perpendicular to the output shaft 23 of the motor 1 and parallel to the horizontal plane. Through the above arrangement, the mounting spaces of the integrated electric drive system in all directions are more balanced, and no large hanging space is left in all directions, which improves the modality of the housing 4 and noise, vibration, and harshness (NVH) of the vehicle. In addition, the integrated electric drive system has a high integration level, which reduces the mounting space of the integrated electric drive system on the vehicle, thereby providing space for the increase of the motor 1. Moreover, a complex wiring harness connection between the components is omitted in the integrated electric drive system with the high integration level.

Figure 2:
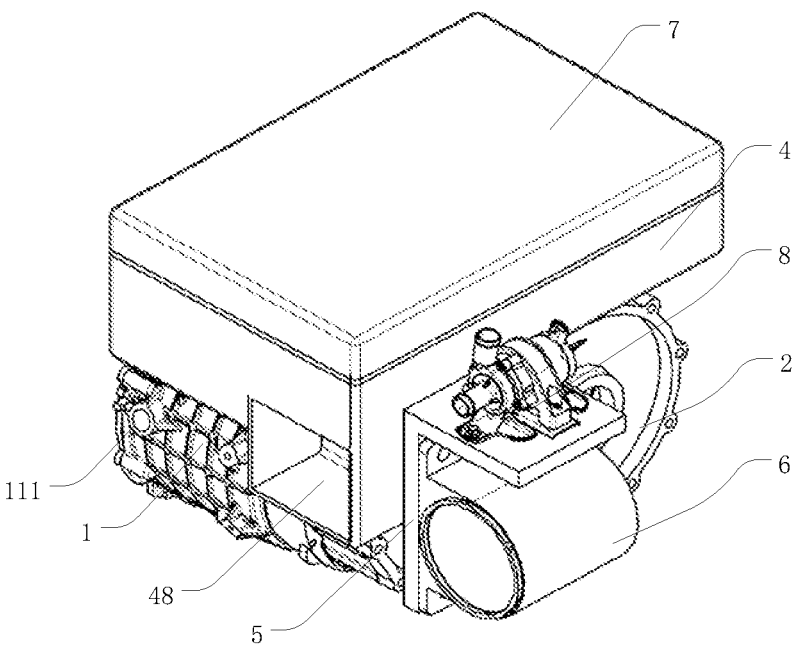
FIG. 2 is a schematic diagram of an assembly structure of an integrated electric drive system according to an embodiment of the present disclosure.

In an embodiment, as shown in FIG. 2, an absolute value of a difference between a half of the length value of the first accommodation space 41 and the length value of the second accommodation space 42 is less than or equal to a third difference threshold in a direction perpendicular to the output shaft 23 of the motor 1 and parallel to the horizontal plane. In some embodiments of the present disclosure, the third difference threshold is zero. That is, a mounting length of the motor 1 accounts for half of the length of the housing 4 in the length direction of the housing 4, and the length of the second accommodation space 42 accounts for only half of the length of the first accommodation space 41, which is configured according to the shape of the motor 1. It may be understood that the third difference threshold may further be set according to an actual demand, for example, a value range of the third difference threshold is 0-10 mm (for example, 3 mm, 6 mm, 9 mm, and the like). Through the arrangement of the second accommodation space 42, the integrated electric drive system can have a higher integration level, which further improves the NVH of the vehicle.

In an embodiment, as shown in FIG. 1 and FIG. 2, the integrated electric drive system further includes an air conditioning compressor 8 and a support 5 mounted on a surface of the speed reducer 2 away from the second accommodation space 42. The air conditioning compressor 8 is mounted to the support 5 and connected with the controller 3. In some embodiments of the present disclosure, the support 5 and the housing of the speed reducer 2 are integrally formed. It may be understood that the support 5 and the air conditioning compressor 8 are located on a side surface of the housing 4. The air conditioning compressor 8 is integrated into the integrated electric drive system through the support 5, which further improves the integration level of the integrated electric drive system.

In an embodiment, as shown in FIG. 1 and FIG. 2, the integrated electric drive system further includes a water pump 6 mounted to the support 5 and connected with the controller 3. It may be understood that the water pump 6 may provide a source of water for a vehicle wiper. In addition, the location configuration of the water pump 6 further improves the integration level of the integrated electric drive system.

In an embodiment, as shown in FIG. 1 and FIG. 2, the support 5 includes a vertical plate and a transverse plate connected at an upper end of the vertical plate. The vertical plate is mounted to a surface of the speed reducer 2 away from the motor 1, and the water pump 6 is mounted below the transverse plate. The air conditioning compressor 8 is mounted to a side of the vertical plate away from the speed reducer 2 and is located above the transverse plate. It may be understood that the water pump 6 is disposed below the support 5, which facilitates a decrease of a length of a connecting pipeline between the water pump 6 and the vehicle wiper, and the air conditioning compressor 8 is mounted above the support 5, which can reserve a large enough space for the connection between the air conditioning compressor 8 and other components of a vehicle air conditioner. In addition, the water pump 6 and the air conditioning compressor 8 are integrated into the integrated electric drive system through the support 5, thereby further improving the integration level of the integrated electric drive system.

Figure 5:
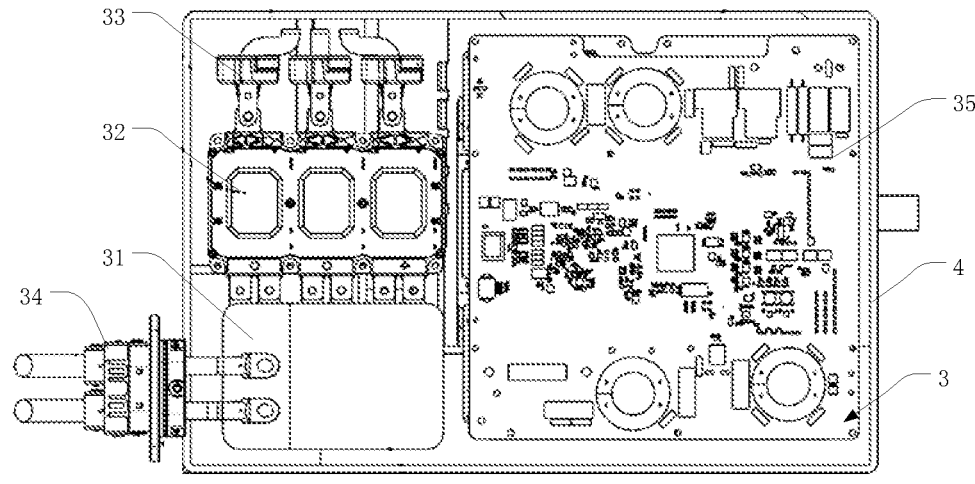
FIG. 5 is a schematic structural diagram of a controller of an integrated electric drive system according to an embodiment of the present disclosure.

In an embodiment, as shown in FIG. 5, the controller 3 includes a capacitor module 31, an insulated gate bipolar transistor (IGBT) module 32, a three-phase copper bar 33, a DC bus 34, an on-board charger, and a DC converter 35. The on-board charger and the DC converter 35 are both connected with a vehicle power battery. The capacitor module 31, the IGBT 32, the three-phase copper bar 33, the on-board charger, and the DC converter 35 are all mounted in the first accommodation space 41. The capacitor module 31 is connected with the vehicle power battery through the DC bus 34 mounted to the housing 4. The three-phase copper bar 33 is connected with a three-phase terminal of the motor 1. It may be understood that the on-board charger and the DC converter 35 is a device integrating the on-board charger and the DC converter. The on-board charger has the ability to fully charge the vehicle power battery safely and automatically. The on-board charger can dynamically adjust a charging current and a charging voltage, and execute a corresponding action to complete the charging process of the vehicle power battery. The DC converter may convert a high voltage of the vehicle power battery to a low voltage required by a storage battery on the vehicle. The on-board charger and the DC converter 35 further improve the integration level of the controller 33.

The vehicle power battery drives the motor 1 to rotate through the DC bus 34, the capacitor module 31, the IGBT 32, and the three-phase copper bar 33 connected in sequence. It may be understood that the vehicle power battery drives the motor 1 to rotate through the above route, and the motor 1 drives vehicle wheels to rotate through the speed reducer 2, thereby realizing that the vehicle power battery drives the vehicle wheels to rotate.

Figure 6:
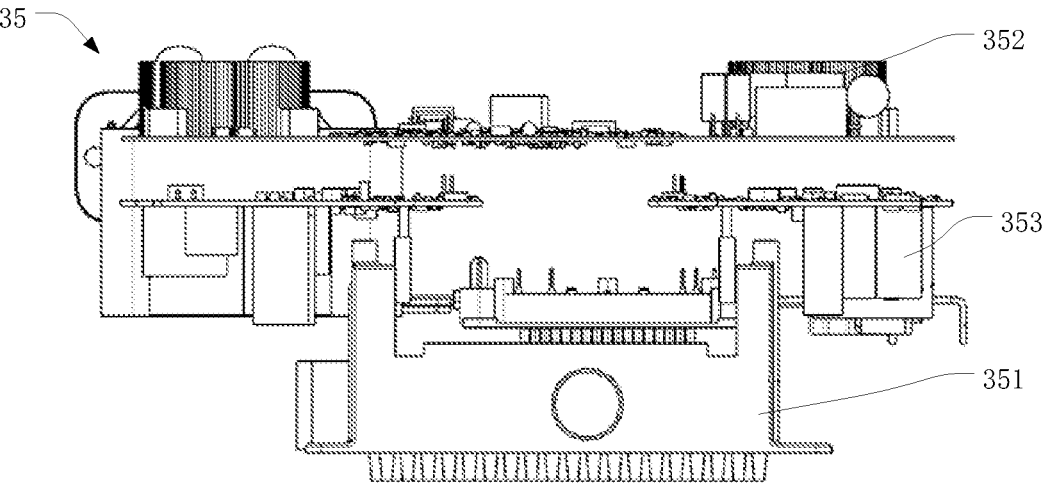
FIG. 6 is a schematic structural diagram of an on-board charger and a DC converter of an integrated electric drive system according to an embodiment of the present disclosure.

In an embodiment, as shown in FIG. 6, the on-board charger and the DC converter 35 include a heat dissipator 351, an electric control element driver 352, and a heating element driver 353. The heating element driver 353 is mounted to the heat dissipator 351, and the electric control element driver 352 is mounted to an end of the heating element driver 353 away from the heat dissipator 351. It may be understood that the heat dissipator 351 is integrated with a heat dissipation member such as a straight cold plate, and the electric control element driver 352 is mainly integrated with an electric control element of the on-board charger and the DC converter 35. For example, the electric control element driver 352 is integrated with electric control elements generating less heat such as a vehicle controller, a controller of the air conditioning compressor 8, a controller of the water pump 6, and a controller of the vehicle power battery. The heating element driver 353 is mainly integrated with heating elements of the on-board charger and the DC converter 35. For example, the heating element driver 353 is integrated with heating elements generating more heat such as the vehicle controller, the controller of the air conditioning compressor 8, the controller of the water pump 6, and the controller of the vehicle power battery. That is to say, the on-board charger and the DC converter 35 include three floors. A middle floor is the heating element driver 353, a upper floor is the electric control element driver 352, and an lower floor is the heat dissipator 351. Since the heat dissipator 351 contacts the cooling water channel inside the housing 4, the floor distributed design of the on-board charger and the DC converter 35 improves the heat dissipation efficiency of the on-board charger and the DC converter 35.

In an embodiment, as shown in FIG. 5, the first accommodation space 41 includes a first internal space and a second internal space both have a rectangular shape and adjacent to each other. It may be understood that the first internal space and the second internal space are respectively located on the left and right sides of the housing 4.

The capacitor module 31, the IGBT 32, and the three-phase copper bar 33 are mounted in the first internal space. The on-board charger and the DC converter 35 are mounted in the second internal space, and the DC bus 34 is located on a side of the first internal space facing away from the second internal space. In some embodiments of the present disclosure, the capacitor module 31, the IGBT 32, and the three-phase copper bar 33 are disposed in the first internal space in sequence. It may be understood that the capacitor module 31, the IGBT 32, the three-phase copper bar 33, and the on-board charger and the DC converter 35 are orderly mounted in the first accommodation space 41, so that the complex wiring harness connection between the components of the controller 3 is eliminated, which enhances the compactness and reliability of the integrated electric drive system and improves the modality of the controller 3.

Figure 7:
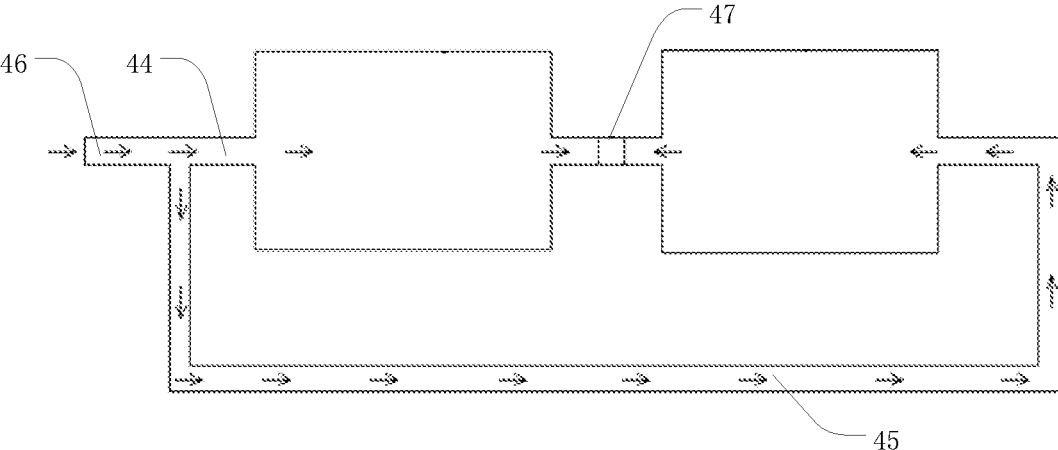
FIG. 7 is a schematic diagram of a first cooling water channel and a second cooling water channel of an integrated electric drive system according to an embodiment of the present disclosure.

In an embodiment, as shown in FIG. 7, the housing 4 includes a first cooling water channel 44, a second cooling water channel 45, a water channel inlet, and a water channel outlet 47. The first cooling water channel 44 is arranged at a position in the housing 4 opposite to the IGBT 32, and the second cooling water channel 45 is arranged at a position in the housing 4 opposite to the on-board charger and the DC converter 35. It may be understood that the first cooling water channel 44 is mainly configured to absorb heat dissipated by the IGBT 32, and the second cooling water channel 45 is mainly configured to absorb heat dissipated by the on-board charger and the DC converter 35. In an embodiment, multiple protrusions are disposed on a lower part of the heat dissipator 351 of the on-board charger and the DC converter 35, and the protrusions are disposed opposite to the second cooling water channel 45. The protrusions can increase a contact area between the heat dissipator 351 and the second cooling water channel 45, thereby improving the heat dissipation efficiency of the heat dissipator 351.

One end of the water channel inlet is connected with a preset water inlet device, the other end of the water channel inlet is connected with the first cooling water channel 44 and the second cooling water channel 45, and the water channel outlet 47 is connected with ends of the first cooling water channel 44 and the second cooling water channel 45 away from the water channel inlet. It may be understood that the first cooling water channel 44 and the second cooling water channel 45 are connected in parallel between the water channel inlet 46 and the water channel outlet 47. In the present disclosure, the design of the first cooling water channel 44 and the second cooling water channel 45 enhances the heat dissipation efficiency of the controller 3, and then increases the service life of the integrated electric drive system.

In an embodiment, as shown in FIG. 1 and FIG. 2, the motor 1 includes an outer enclosure 11 connected with the speed reducer 2 and an inner enclosure 12 inserted in the outer enclosure 11. A cooling space is formed between an inner wall of the outer enclosure 11 and an outer wall of the inner enclosure 12. A water inlet and a water outlet 111 both in communication with the cooling space are disposed on the outer enclosure 11. An end of the water channel outlet 47 away from the first cooling water channel 44 is in communication with the water inlet. It may be understood that the design of the cooling space can improve the heat dissipation efficiency of the motor 1, thereby extending the service life of the motor 1.

In some embodiments, the cooling liquids in two paths flow in from the water channel inlet. The cooling liquid in one path absorbs heat of the IGBT 32 through the first cooling water channel 44, and the cooling liquid in the other path absorbs heat dissipated by the on-board charger and the DC converter 35 through the second cooling water channel 45. The cooling liquids in two paths are collected through the water channel outlet 47 and flow through the water inlet into the cooling space. The cooling liquid absorbs the heat dissipated by the motor 1 in the cooling space and flows out from the water outlet 111. In the present disclosure, the cooling liquid can cool the IGBT 32, the on-board charger and the DC converter 35, and the motor 1, which increases the utilization rate of the cooling liquid.

In an embodiment, as shown in FIG. 1 and FIG. 2, multiple ribbed flow guide plates are disposed on the outer wall of the inner enclosure 12 in a circumferential direction of the output shaft 23 of the motor 1. It may be understood that the ribbed flow guide plates can cause the cooling liquid in the cooling space to flow in a circumferential direction of the inner enclosure 12, thereby enhancing the cooling efficiency of the motor 1.

Figure 8:
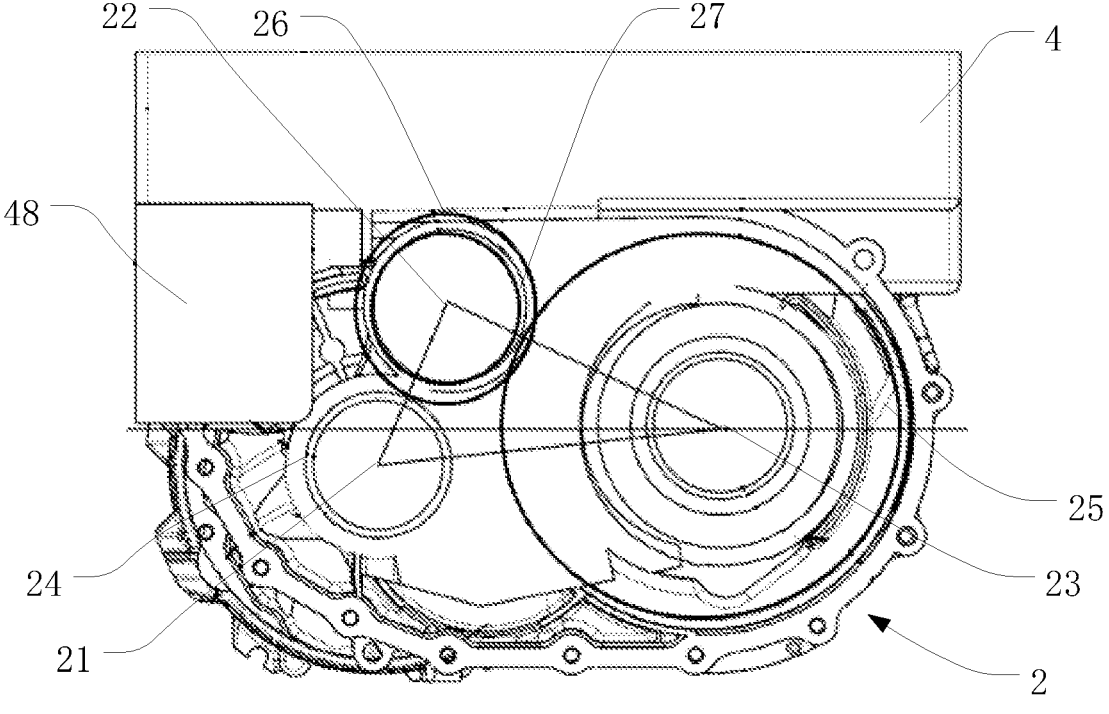
FIG. 8 is a schematic structural diagram of a speed reducer of an integrated electric drive system according to an embodiment of the present disclosure.

In an embodiment, as shown in FIG. 8, the speed reducer 2 includes a main shaft 21, an intermediate shaft 22, an output shaft 23, a driving gear 24, an output gear 25, an intermediate driving gear 26, and an intermediate driven gear 27. The main shaft 21 is connected with the output shaft of the motor 1. The driving gear 24 is mounted to the main shaft 21, the intermediate driving gear 26 and the intermediate driven gear 27 are both mounted to the intermediate shaft 22, and the output gear 25 is mounted to the output shaft 23. The intermediate driving gear 26 is meshed with the driving gear 24. The intermediate driven gear 27 is meshed with the output gear 25. It may be understood that the output shaft 23 of the motor 1 passes through the main shaft 21, the driving gear 24, the intermediate driving gear 26, the intermediate shaft 22, the intermediate driven gear 27, the output gear 25, and the output shaft 23 in sequence, and then drives the vehicle wheel to rotate.

An axis of the intermediate shaft 22 is higher than axes of the main shaft 21 and the output shaft 23. An included angle between a line connecting a center point of the main shaft 21 to a center point of the output shaft 23 and the horizontal plane is less than or equal to a preset angle on a plane perpendicular to the axis of the main shaft 21. The preset angle may be set according to the design requirement. For example, a value range of the preset angle is −10 degrees to 10 degrees. In some embodiments of the present disclosure, an included angle between a line connecting a center point of the main shaft 21 to a center point of the output shaft 23 and the horizontal plane is equal to 0 degrees. It may be understood that the intermediate shaft 22 is located above the main shaft 21 and the output shaft 23, and the intermediate driving gear 26 and the intermediate driven gear 27 are both located above the driving gear 24 and the output gear 25. The design of the speed reducer 2 can lower the center of gravity of the integrated electric drive system and the center of gravity of the vehicle, thereby improving the driving stability of the vehicle and increasing the driving pleasure of the vehicle.

In an embodiment, as shown in FIG. 1 and FIG. 2, a battery mounting space 48 configured for a battery to be mounted is disposed on a surface of the housing 4 facing away from the first opening. It may be understood that the integrated electric drive system further includes a battery mounted in the battery mounting space 48. In an embodiment, as shown in FIG. 2, the battery mounting space 48 has a second opening, and a direction of the second opening is perpendicular to a direction of the first opening. It may be understood that the battery mounting space 48 is integrated in a lower portion of the housing 4, so that the battery can be mounted in the battery mounting space 48. It should be noted that the battery mounted in the battery mounting space 48 is a small battery of 12 V. The small battery is usually used for a low power subsystem of the vehicle, such as a vehicle door opening/closing subsystem, a vehicle start subsystem, and a vehicle light subsystem. The design of the battery further improves the integration level of the integrated electric drive system.

In an embodiment, as shown in FIG. 1 and FIG. 2, the integrated electric drive system further includes a housing cover 7 adaptively connected with the first opening, such as the shape of the housing cover 7 matching that of the first opening. It may be understood that the enclosure cover 7 is connected with the housing 4, to protect the controller 3 inside the housing 4.

The foregoing descriptions are merely some embodiments of the present disclosure, but do not limit the present disclosure. Any modification, equivalent replacement, or improvement made within the spirit and principle of the present disclosure shall fall within the protection scope of the present disclosure.

What is claimed is:

1. A drive system, comprising a motor, a speed reducer, a controller, and a housing, wherein
   the housing comprises a first accommodation space having a first opening and configured for accommodating the controller; a second accommodation space configured for accommodating the motor; and a third accommodation space configured for accommodating the speed reducer, the second accommodation space and the third accommodation space of the housing are disposed below the first accommodation space; the controller is connected with the motor; and an output shaft of the motor is connected with the speed reducer;
   in a length direction of the output shaft of the motor, an absolute value of a difference between a mounting width value and a width value of the first accommodation space is less than or equal to a first difference threshold; and the mounting width value is a sum of a width value of the second accommodation space and a width value of the third accommodation space;

in a direction perpendicular to the length direction of the output shaft of the motor and parallel to a horizontal plane, an absolute value of a difference between a length value of the first accommodation space and a length value of the third accommodation space is less than or equal to a second difference threshold; and in a projection onto the horizontal plane, a substantial area of a projection of the second accommodation space overlaps with a projection of the first opening, and a substantial area of a projection of the third accommodation space overlaps with the projection of the first opening.

2. The drive system according to claim 1, wherein, in the direction perpendicular to the length direction of the output shaft of the motor and parallel to the horizontal plane, an absolute value of a difference between a half of the length value of the first accommodation space and the length value of the second accommodation space is less than or equal to a third difference threshold.

3. The drive system according to claim 2, wherein the first difference threshold is zero.

4. The drive system according to claim 2, wherein the second difference threshold is zero.

5. The drive system according to claim 2, wherein the third difference threshold is zero.

6. The drive system according to claim 1, further comprising an air conditioning compressor and a support mounted on a surface of the speed reducer away from the second accommodation space, wherein the air conditioning compressor is mounted to the support and connected with the controller.

7. The drive system according to claim 6, further comprising a water pump mounted on the support and connected with the controller.

8. The drive system according to claim 7, wherein the support comprises a vertical plate and a transverse plate connected with an upper end of the vertical plate; the vertical plate is mounted to a surface of the speed reducer away from the motor; the water pump is mounted below the transverse plate; and the air conditioning compressor is mounted to a side of the vertical plate away from the speed reducer and is located above the transverse plate.

9. The drive system according to claim 1, wherein the controller comprises a capacitor, an insulated-gate bipolar transistor (IGBT), a three-phase copper bar, a DC bus, an on-board charger, and a DC converter; the on-board charger and the DC converter are connected with a vehicle power battery; the capacitor, the IGBT, the three-phase copper bar, the on-board charger, and the DC converter are mounted in the first accommodation space; the capacitor is connected with the vehicle power battery through the DC bus mounted to the housing; the three-phase copper bar is connected with a three-phase terminal of the motor; and the vehicle power battery drives the motor to rotate through the DC bus, the capacitor, the IGBT, and the three-phase copper bar connected in sequence.

10. The drive system according to claim 9, wherein the on-board charger and the DC converter comprise a heat dissipator, an electric control element driver, and a heating element driver; the heating element driver is mounted to the heat dissipator; and the electric control element driver is mounted to an end of the heating element driver away from the heat dissipator.

11. The drive system according to claim 9, wherein
the first accommodation space comprises a first internal space and a second internal space both having a rectangular shape and adjacent to each other; and
the capacitor, the IGBT, and the three-phase copper bar are mounted in the first internal space; the on-board charger and the DC converter are mounted in the second internal space; and the DC bus is located on a side of the first internal space facing away from the second internal space.

12. The drive system according to claim 9, wherein
the housing comprises a first cooling water channel, a second cooling water channel, a water channel inlet, and a water channel outlet; the first cooling water channel is arranged at a position in the housing opposite to the IGBT; and the second cooling water channel is arranged at a position in the housing opposite to the on-board charger and the DC converter; and
a first end of the water channel inlet is connected with a water inlet device; a second end of the water channel inlet is connected with the first cooling water channel and the second cooling water channel; and the water channel outlet is connected with an end of the first cooling water channel and an end of the second cooling water channel away from the water channel inlet.

13. The drive system according to claim 12, wherein the motor comprises an outer enclosure connected with the speed reducer and an inner enclosure inserted in the outer enclosure; a cooling space is formed between an inner wall of the outer enclosure and an outer wall of the inner enclosure; a water inlet and a water outlet in communication with the cooling space are disposed on the outer enclosure; and an end of the water channel outlet away from the first cooling water channel is in communication with the water inlet.

14. The drive system according to claim 13, wherein a plurality of ribbed flow guide plates are disposed on the outer wall of the inner enclosure in a circumferential direction of the output shaft of the motor.

15. The drive system according to claim 1, wherein
the speed reducer comprises a main shaft, an intermediate shaft, an output shaft, a driving gear, an output gear, an intermediate driving gear, and an intermediate driven gear; the main shaft is connected with the output shaft of the motor; the driving gear is mounted to the main shaft; the intermediate driving gear and the intermediate driven gear are mounted to the intermediate shaft; the output gear is mounted to the output shaft of the speed reducer; the intermediate driving gear is meshed with the driving gear; and the intermediate driven gear is meshed with the output gear; and
on a plane perpendicular to an axis of the main shaft, an axis of the intermediate shaft is higher than the axis of the main shaft and an axis of the output shaft of the speed reducer; and an included angle between the horizontal plane and a line connecting a center point of the main shaft to a center point of the output shaft of the speed reducer is less than or equal to a preset angle.

16. The drive system according to claim 1, wherein a battery mounting space configured for mounting a battery is disposed on a surface of the housing facing away from the first opening.

17. The drive system according to claim 1, further comprising a housing cover adaptively connected with the first opening.

18. An electric vehicle, comprising a drive system, wherein the drive system comprises a motor, a speed reducer, a controller, and a housing, wherein the housing comprises a first accommodation space having a first opening and configured for accommodating the controller; a second accommodation space configured for accommodating the motor; and a third accommodation space configured for accommodating the speed reducer, the second accommodation space and the third accommodation space of the housing are disposed below the first accommodation space; the controller is connected with the motor; and an output shaft of the motor is connected with the speed reducer;

in a length direction of the output shaft of the motor, an absolute value of a difference between a mounting width value and a width value of the first accommodation space is less than or equal to a first difference threshold; and the mounting width value is a sum of a width value of the second accommodation space and a width value of the third accommodation space;

in a direction perpendicular to the length direction of the output shaft of the motor and parallel to a horizontal plane, an absolute value of a difference between a length value of the first accommodation space and a length value of the third accommodation space is less than or equal to a second difference threshold; and in a projection onto the horizontal plane, a substantial area of a projection of the second accommodation space overlaps with a projection of the first opening, and a substantial area of a projection of the third accommodation space overlaps with the projection of the first opening.

19. The electric vehicle according to claim 18, wherein the controller comprises a capacitor, an insulated-gate bipolar transistor (IGBT), a three-phase copper bar, a DC bus, an on-board charger, and a DC converter; the on-board charger and the DC converter are connected with a vehicle power battery; the capacitor, the IGBT, the three-phase copper bar, the on-board charger, and the DC converter are mounted in the first accommodation space; the capacitor is connected with the vehicle power battery through the DC bus mounted to the housing; the three-phase copper bar is connected with a three-phase terminal of the motor; and the vehicle power battery drives the motor to rotate through the DC bus, the capacitor, the IGBT, and the three-phase copper bar connected in sequence.

20. The electric vehicle according to claim 19, wherein the housing comprises a first cooling water channel, a second cooling water channel, a water channel inlet, and a water channel outlet; the first cooling water channel is arranged at a position in the housing opposite to the IGBT; and the second cooling water channel is arranged at a position in the housing opposite to the on-board charger and the DC converter; and a first end of the water channel inlet is connected with a water inlet device; a second end of the water channel inlet is connected with the first cooling water channel and the second cooling water channel; and the water channel outlet is connected with an end of the first cooling water channel and an end of the second cooling water channel away from the water channel inlet.

* * * * *